(No Model.)
J. E. BLACKMORE.
CAR AXLE.
No. 415,955. Patented Nov. 26, 1889.
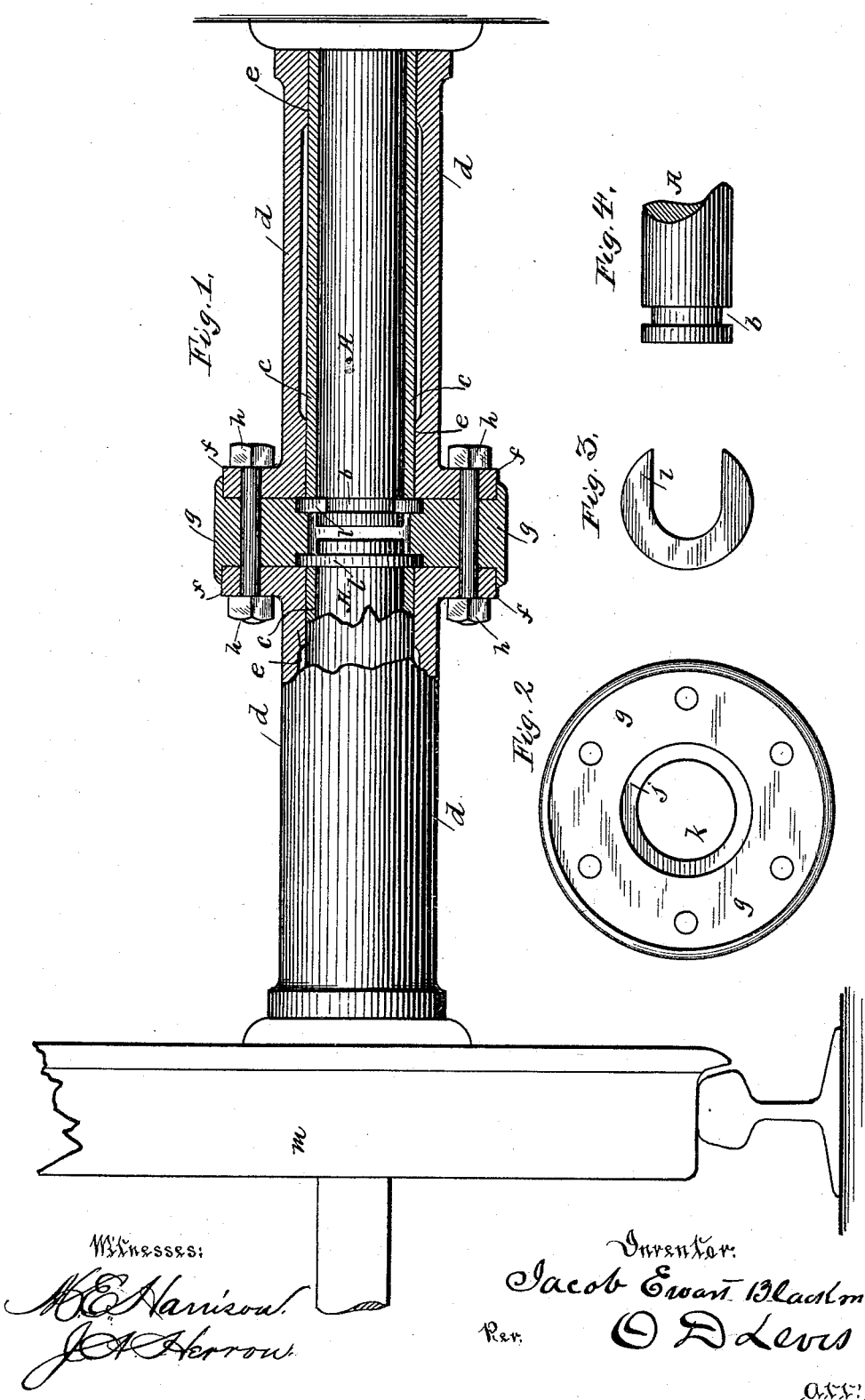
Witnesses:
M. E. Harrison
J. A. Herrow
Inventor:
Jacob Ewart Blackmore
Per O. D. Levis
Atty

UNITED STATES PATENT OFFICE.

JACOB EWART BLACKMORE, OF PITTSBURG, PENNSYLVANIA, ASSIGNOR OF ONE-HALF TO SAMUEL J. WAINWRIGHT, OF SAME PLACE.

CAR-AXLE.

SPECIFICATION forming part of Letters Patent No. 415,955, dated November 26, 1889.

Application filed February 18, 1889. Serial No. 300,350. (No model.)

*To all whom it may concern:*

Be it known that I, JACOB EWART BLACKMORE, a citizen of the United States, residing at Pittsburg, in the county of Allegheny and State of Pennsylvania, have invented certain new and useful Improvements in Car-Axles; and I do hereby declare the following to be a full, clear, and exact description of the invention, such as will enable others skilled in the art to which it pertains to make and use the same, reference being had to the accompanying drawings, which form a part of this specification.

My invention relates to an improvement in car-axles; and it consists in a divided axle coupled together at the center by means of two sleeves, plain or ribbed, surrounding the said axle and attached to a center piece by bolts in a manner that will permit the one wheel to revolve independent of the other, together with certain other details of construction and combination of parts, as will be fully described hereinafter.

In the accompanying drawings, Figure 1 is a front sectional elevation of a car-axle constructed in accordance with my invention, the same being partly shown in elevation the better to show its working parts. Fig. 2 is a face view of the center casting, to which the sleeves are attached. Fig. 3 is a face view of the open washer used for confining the axles within the sleeves. Fig. 4 is a front elevation of one end of the divided axle, showing the groove in which the open washer is placed.

To put my invention into practice with an ordinary railway-axle A, such as are now in common use, the same is divided at the center and provided at each end with a groove $b$. Over each of these portions of the axle A is a metallic bushing $c$, which is driven rigidly into the sleeves $d$ in a manner that will hold the bushing $c$ stationary, and the internal surface bored or faced evenly. Over this bushing $c$ is placed a malleable or other metallic plain or ribbed sleeve $d$, provided with bearings $e$ at each end, and an outwardly-projecting flange $f$, which fits against a circular central casting $g$, and the whole coupled or attached together by a series of transverse bolts $h$. A recess $j$ and opening $k$ in the center of this piece $g$ allows the ends of the divided axle A to be secured therein by means of an open washer $l$, which has a bearing against the ends of the sleeve $d$ and the side walls of the grooves $b$, thereby preventing any movement of the axle A in the direction of its length.

In constructing an axle A such as described the bushings $c$ are first put in place in the sleeve $d$ and finished, the grooves $b$ formed in the axle A, and the sleeves $d$ and bushing $c$ slipped over the axle A. The washers $l$ are now fitted into the grooves $b$, which locks the sleeves $d$ in position. The center piece $g$ is loosely secured in place on the flanged end $f$ of one of the sleeves $d$ by passing the bolts $h$ through the flange $f$ and center piece $g$. The other sleeve $d$ is now placed into position and the several parts rigidly attached together by means of the bolts $h$.

It will be seen that by means of this construction of an axle the wheels $m$ may revolve entirely independent of each other, which will greatly reduce the friction on the same when traveling about sharp curves.

Having thus described my invention, what I claim, and desire to secure by Letters Patent, is—

1. In combination with a car-axle A, divided at the center, the bushings $c$, secured in the sleeves $d$, the sleeves $d$ having bearings $e$ at each end of the same and provided with outwardly-projecting flanges $f$, the central piece $g$, and suitable bolts $h$, for coupling the same to the flanges $f$ of the sleeves $d$, and the open washers $l$, fitted into grooves formed in the ends of the divided axle A as a means for preventing any movement of the axle A in the direction of its length, substantially as set forth.

2. In combination with a car-axle A, divided at the center, the sleeves $d$, having a flanged end $f$, the center piece $g$, having a recess $j$ and opening $k$ in the center of the same, the grooves $b$, and open washers $l$, substantially as and for the purpose described.

In testimony that I claim the foregoing I hereunto affix my signature this 2d day of January, A. D. 1889.

JACOB EWART BLACKMORE. [L. S.]

In presence of—
C. C. LEE,
M. E. HARRISON.